United States Patent
Zittel et al.

(12)

(10) Patent No.: US 6,205,913 B1
(45) Date of Patent: Mar. 27, 2001

(54) ROTARY DRUM BLANCHER FOR COOKING FOOD

(75) Inventors: David R. Zittel; Daniel D. Maupin, both of Columbus; Steven W. Hughes, Beaver Dam, all of WI (US)

(73) Assignee: Lyco Manufacturing Inc., Columbus, WI (US)

( * ) Notice: Subject to any disclaimer, the term of this patent is extended or adjusted under 35 U.S.C. 154(b) by 0 days.

(21) Appl. No.: 09/504,329

(22) Filed: Feb. 14, 2000

(51) Int. Cl.⁷ .............................. A23L 1/00; A23L 3/00; A23N 12/00; A47J 37/12; F25D 25/02

(52) U.S. Cl. ............................ 99/348; 99/355; 99/404; 99/409; 99/443 C; 99/470; 99/517; 134/65; 134/132

(58) Field of Search ............................ 99/348, 352–355, 99/360, 365, 403, 409, 450, 470, 483, 487, 516, 517, 534, 536, 477–479, 443 R, 443 C; 366/81, 91, 101, 102, 144, 149, 234, 290, 318, 319, 322, 324; 134/65, 132; 62/381; 100/117, 145

(56) References Cited

U.S. PATENT DOCUMENTS

| | | | |
|---|---|---|---|
| 1,231,002 | * 6/1917 | Steere | 134/132 |
| 1,290,396 | * 1/1919 | Steere | 134/132 |
| 1,806,957 | * 5/1931 | Stocking | 134/132 |
| 2,166,197 | * 7/1939 | Schaub | 366/322 |
| 2,314,871 | * 3/1943 | DeBack | 134/65 |
| 2,909,872 | * 10/1959 | Kearney et al. | 134/132 |
| 3,135,668 | * 6/1964 | Wesson | 134/132 |
| 3,484,360 | * 12/1969 | Sandrock | 366/234 |
| 3,760,714 | * 9/1973 | Lortz | 99/404 |
| 4,410,553 | * 10/1983 | McGinty | 99/348 |
| 4,942,810 | 7/1990 | Zittel et al. | 99/477 |
| 5,133,249 | 7/1992 | Zittel | 99/348 |
| 5,146,841 | * 9/1992 | Zittel | 99/348 |
| 5,329,842 | * 7/1994 | Zittel | 99/348 |
| 5,429,041 | 7/1995 | Zittel | 99/348 |
| 5,592,869 | 1/1997 | Zittel | 99/348 |
| 5,632,195 | * 5/1997 | Zittel | 99/348 |

* cited by examiner

*Primary Examiner*—Timothy F. Simone
(74) *Attorney, Agent, or Firm*—Nilles & Nilles SC

(57) ABSTRACT

A rotary blancher that is substantially sealed during operation to increase food product heating speed and efficiency. The blancher has a sealed housing, a novel substantially sealed food product inlet, and a novel substantially sealed food product outlet. A heat transfer medium, such as water or only steam, is introduced into the blancher to heat the food product inside the blancher. During operation, food products are substantially continuously introduced into the blancher through the food product inlet, processed by the blancher, and thereafter discharged from the blancher through the food product outlet. As a result, a greater amount of food products can be more quickly heated to a desired temperature using a blancher of this invention as compared to a blancher that is not sealed.

17 Claims, 7 Drawing Sheets

ROTARY DRUM BLANCHER FOR COOKING FOOD

BACKGROUND OF THE INVENTION

1. Field of the Invention

The present invention relates to rotary blanchers for processing food products. More particularly, the invention relates to such a food blancher which can operate in the conventional mode with water or with steam only to thereby more efficiently and uniformly and quickly heat the food product in the blancher.

2. Description of the Related Art

Various prior art blanchers have been proposed such as shown in several U.S. patents: U.S. Pat. No. 4,942,810, issued Jul. 24, 1990; U.S. Pat. No. 5,133,249, issued Jul. 28, 1992; U.S. Pat. No. 5,429,041, issued Jul. 4, 1995; and U.S. Pat. No. 5,592,869, issued Jan. 14, 1997.

OBJECTS AND SUMMARY OF THE INVENTION

The present invention provides blancher for cooking food having novel means for introducing the food product into the blancher and also having novel means for removing the finished product from the blancher, both of which are open to atmosphere but act to contain the steam. The inlet feed arrangement utilizes a trough-like flume and water nozzles direct water into the trough to thereby wet its interior and prevents sticking and facilitates movement of the food, such as pasta through the flume and into the housing. The steam is contained at the entry end by condensing it with the flume water. The water used in such a flume is taken from a water supply located in the interior of the housing, is then directed through the flume where it then enters the housing at a slight pressure above atmospheric, and returns the steam to the water supply in the bottom of the housing.

Another aspect of the present invention relates to an improved exit or discharge chute for the finished product and which has a vacuum pump connected to the chute for capturing and drawing off most of the steam from the chute and passing the steam back into a water supply in the bottom of the housing, thus forming a substantially closed circuit in which the steam is taken from the discharge chute and then passing the removed steam directly into the water supply in the bottom of the housing.

Another aspect of the invention relates to delivering live steam into the housing at a location just above the water supply in the housing and adjacent the lower side of a rotatable drum for heating the interior of the housing and drum in an efficient manner for cooking food passing therethrough.

Another aspect of the invention relates to a very effective seal labyrinth between the adjacent ends of said housing and drum to prevent steam loss from the interior of the housing.

These and other objects and advantages of the invention will appear as this disclosure progresses.

DESCRIPTION OF THE PREFERRED EMBODIMENT

Figure 1:
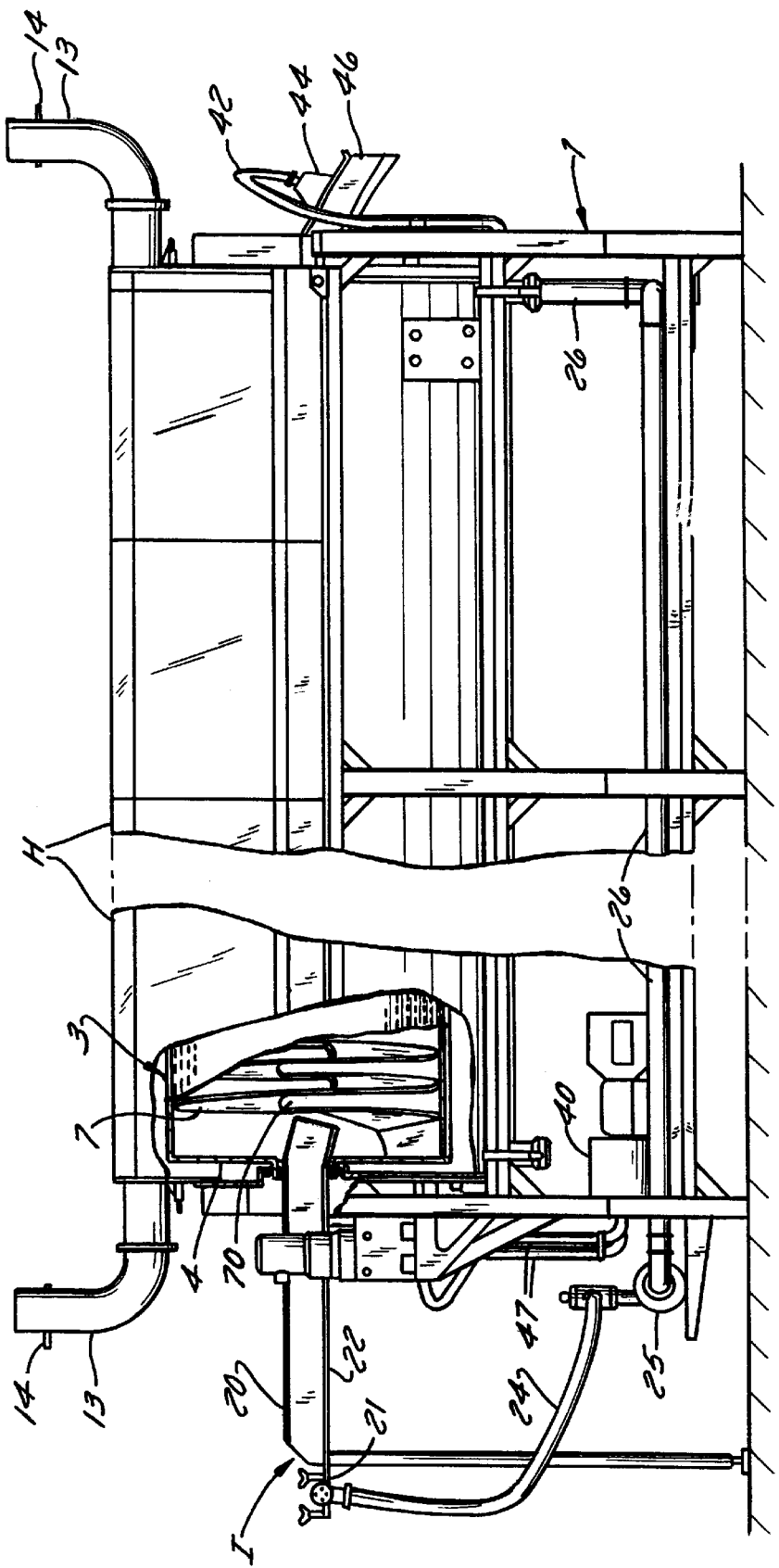
FIG. 1 is a side elevational view of a blancher made in accordance with the present invention with certain portions broken away and removed.
Figure 2:
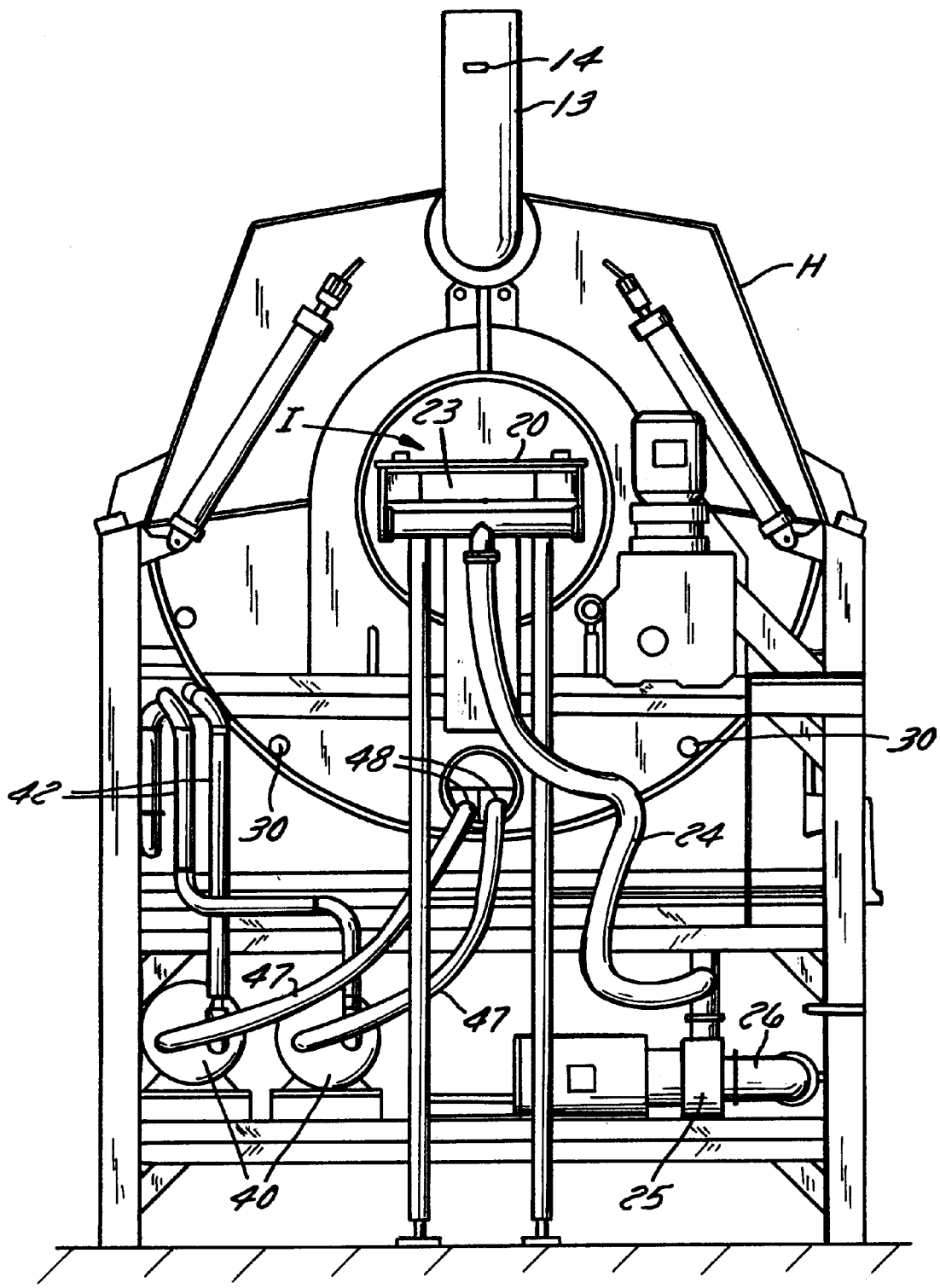
FIG. 2 is an elevational view of the in-feed end of the blancher shown in FIG. 1.
Figure 6:
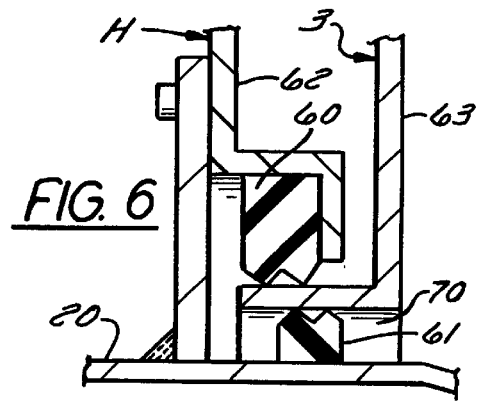
FIG. 6 is an enlarged, fragmentary sectional view of the labyrinth seals of FIG. 5.
Figure 7:
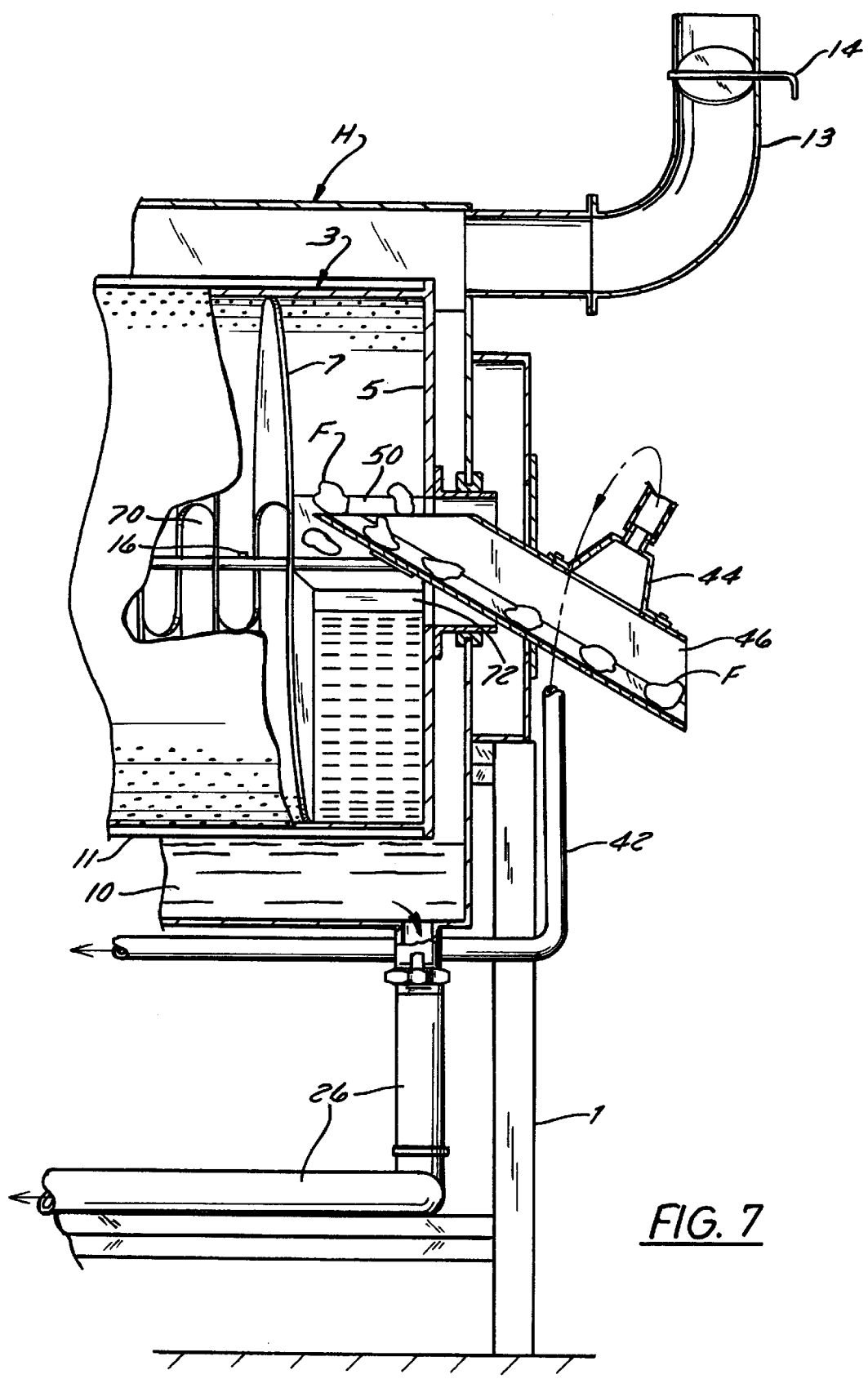
FIG. 7 is an enlarged fragmentary elevational view of the discharge end of the blancher, certain parts being shown in section or broken away for the sake of clarity.
Figure 9:
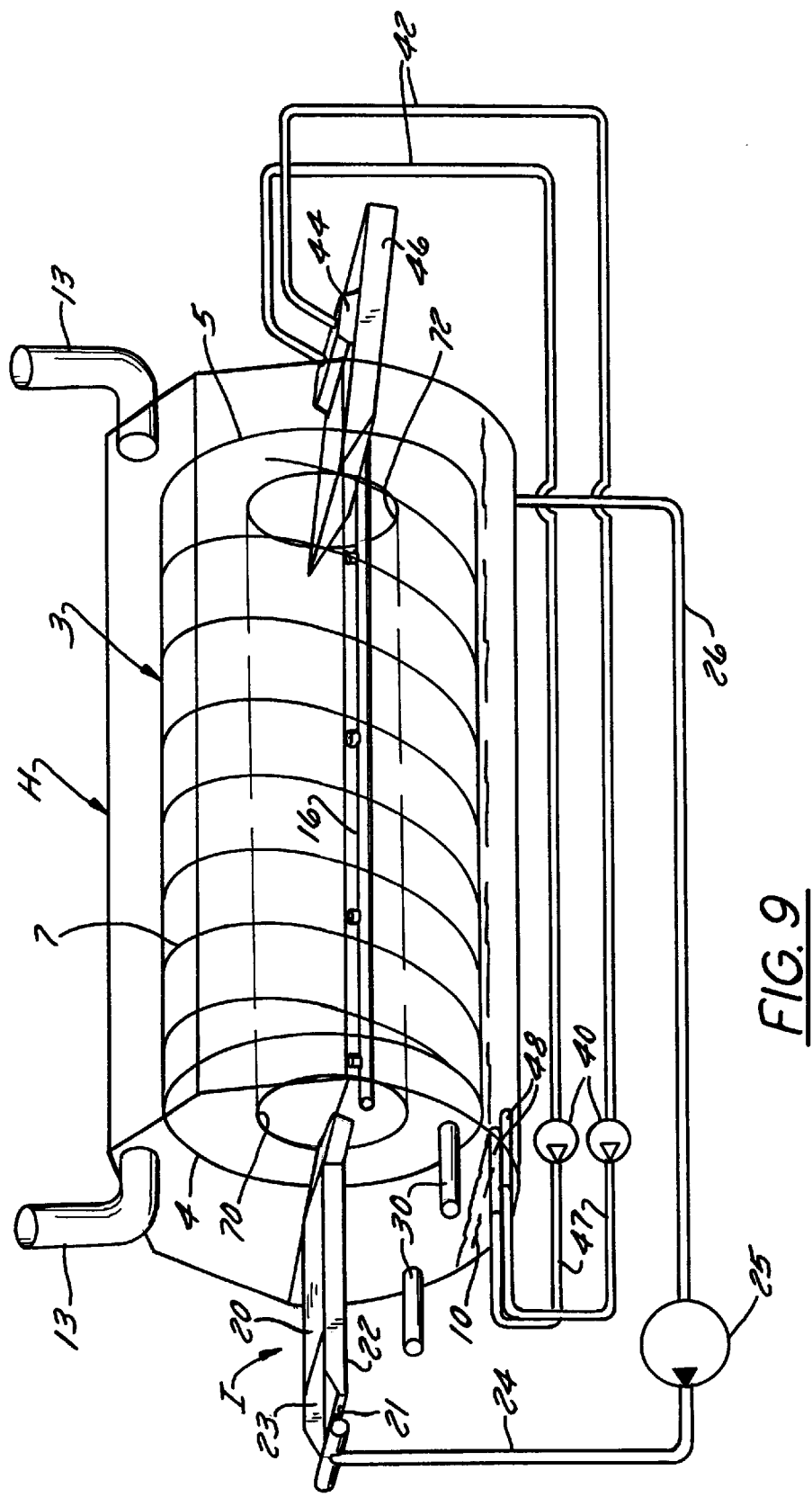
FIG. 9 is a schematic view of the blancher as shown in FIG. 1.

The blancher provided by the present invention includes a large outer housing H which is generally tubular and elongated and is positioned on a stand 1 for being supported above the floor. The two-piece housing H and stand are of conventional construction generally as shown in some of the above-mentioned patents. Rotatably supported within the housing is an elongated and cylindrical perforated drum 3 and rotatably supported at each of its inlet and outlet end walls 4 and 5, within the housing by labyrinth seals (FIG. 6). Within the drum is a food transporting mechanism which is rotatably mounted and which may include an auger 7 (FIGS. 14, 7) that moves the food product F that moves the food product F axially through the drum from the inlet feed shown at the left end of FIGS. 1 and 9 and to the opposite end where the food product is discharged from the blancher as will appear.

Figure 8:
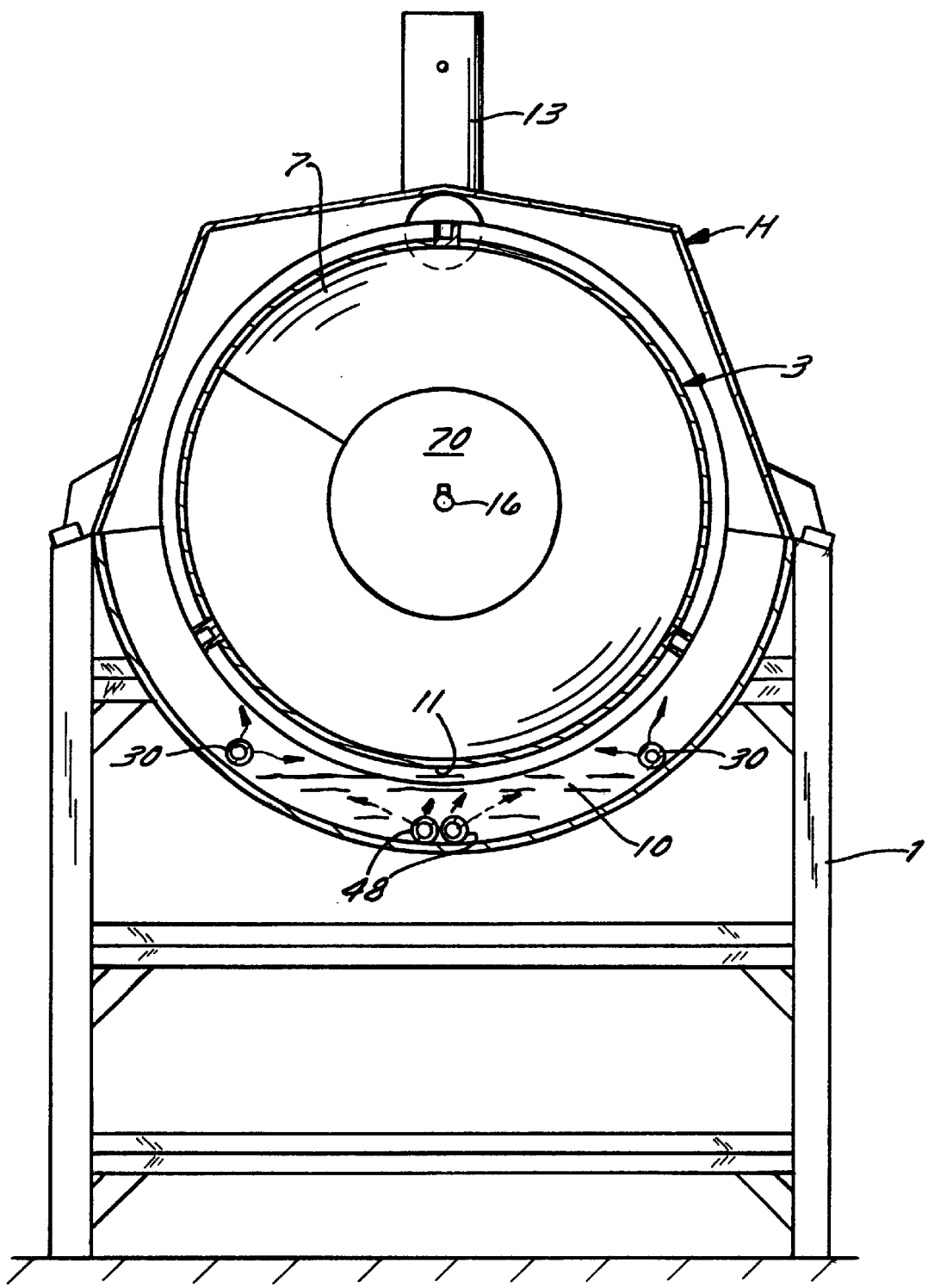
FIG. 8 is a transverse sectional view through the blancher, certain parts being removed for clarity, and showing the position of the water supply, the live steam lines and the water line inlet in the water, and also showing the temperature sensor in the center of the housing.

Along the inside of the bottom of the housing is a water supply 10 (FIGS. 7&8) which is approximately six inches in depth and comes up to the bottom 11 of the drum 3.

At each end of the housing is a strategically located steam vent duct 13 which has a valve 14 for regulating the discharge of the vented steam from the housing: a discharge of about 1500 CFM is common. A temperature sensor 16 (FIGS. 8 and 9) is located in the center of the drum 3 and is electrically connected (not shown) to a control panel (not shown). The valves 14 are also connected with the control panel to regulate the temperature of the interior of the blancher as sensed by sensor 16.

Figure 4:
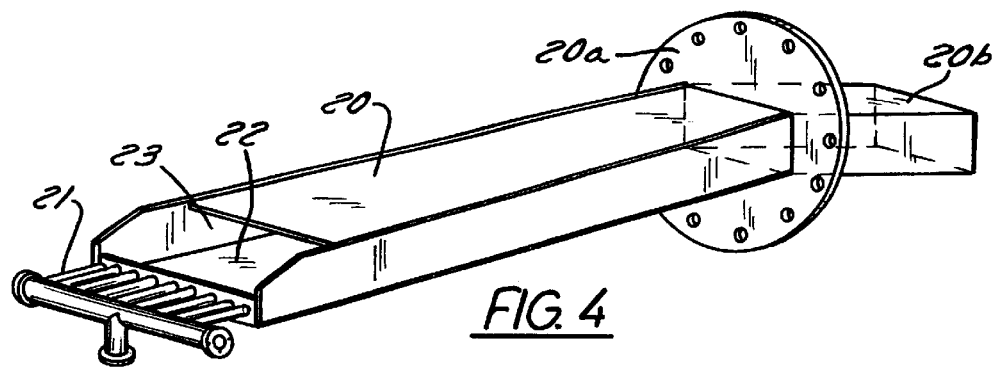
FIG. 4 is an enlarged perspective view of the in-feed flume shown in FIGS. 1 and 2.
Figure 5:
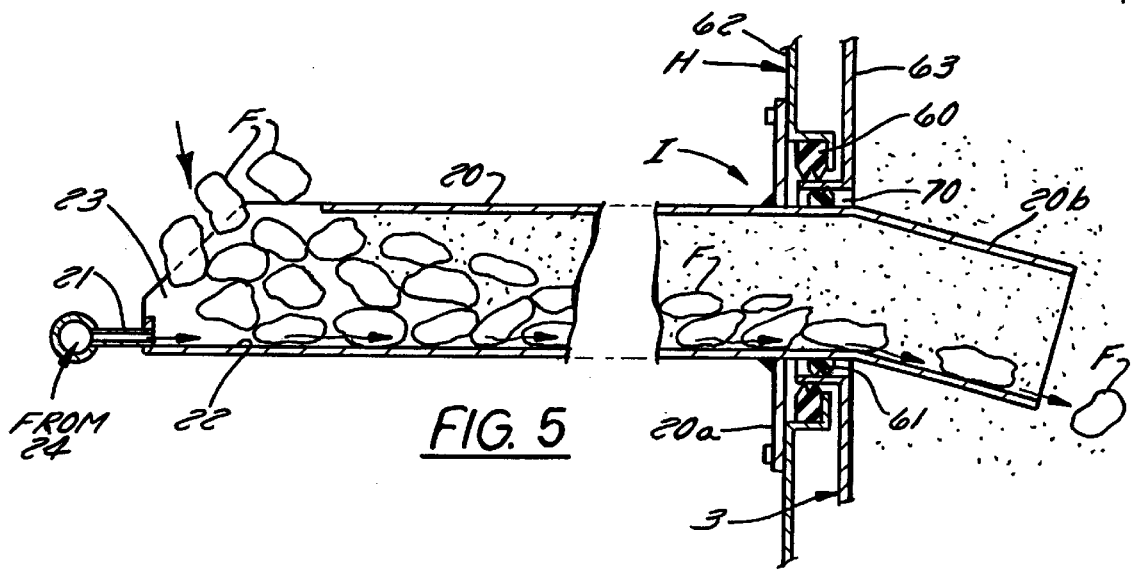
FIG. 5 is an enlarged cross-sectional view of the in-feed flume arrangement shown in FIG. 4, certain parts being shown as broken away or removed for the sake of clarity.

More specifically the present invention provides an improved food product inlet I (FIGS. 1, 2, 5, 9) for the blancher housing in which an in-feed flume 20 having mounting flange 20a is provided and which has means such as nozzles 21 for spraying water along the flat bottom 22 of the flume whereby the in-feed product F entering opening 23 of the flume is caught in the spray and pushed onto slide 20b into the drum 3. The spray of water lubricates the flume and prevents the product, such as pasta, from sticking to the flume. The flume is enclosed as far as possible, as shown in FIGS. 4 and 5, and the incoming food product which has been sprayed serves to effectively and substantially seal the flume opening 23 for preventing steam from leaking out or air from leaking into the inlet end of the housing. The food product F, which has been sprayed with water, acts to condense the steam, which attempts to escape through the inlet. Thus, the steam attempting to escape through the inlet is condensed and is thus contained at the entry.

Water for the flume is provided by the water supply 10 in the bottom of the housing (FIGS. 1, 2, 9) via a conduit 24, pump 25, and pipe 26 which is in communication with the end of the drum housing.

The source of water which is located in the bottom of the housing and beneath the cylindrical drum provides several different functions. The water is maintained at a depth of about six inches of water in the housing which brings it up to the bottom level of the drum within the housing, the water acts as a source for the above mentioned flume and also acts as a barrier for the steam and forces the steam up into the product in the perforated cylinder and also provides moisture which wets the steam for better heat transfer. Thus, pump 25 is provided in the water line 26 which draws water from the end of the tank and brings it into the pump 25 intake line for being pumped into the flume. Thus, the water makes a closed loop from the tank bottom, through the pump which feeds the flume where it then enters the perforated drum, falls through the perforations in the drum to the housing bottom and completes the cycle. By thus using the water, the blancher works more efficiently in a saturated water environment, that is, the water does a better job of penetrating the product than does "dry steam." By having a reservoir of water in the tank bottom, a more efficient product entry is obtained via the flume, and simultaneously steam containment upon entry is assured. A saturated steam environment is provided by having water in the tank along with live steam injection from live steam pipes 30 (FIGS. 1, 2, 8, 9). Furthermore water in the tank helps keep the bottom of the perforated rotating drum clean and prevents a buildup of food particles.

Figure 3:
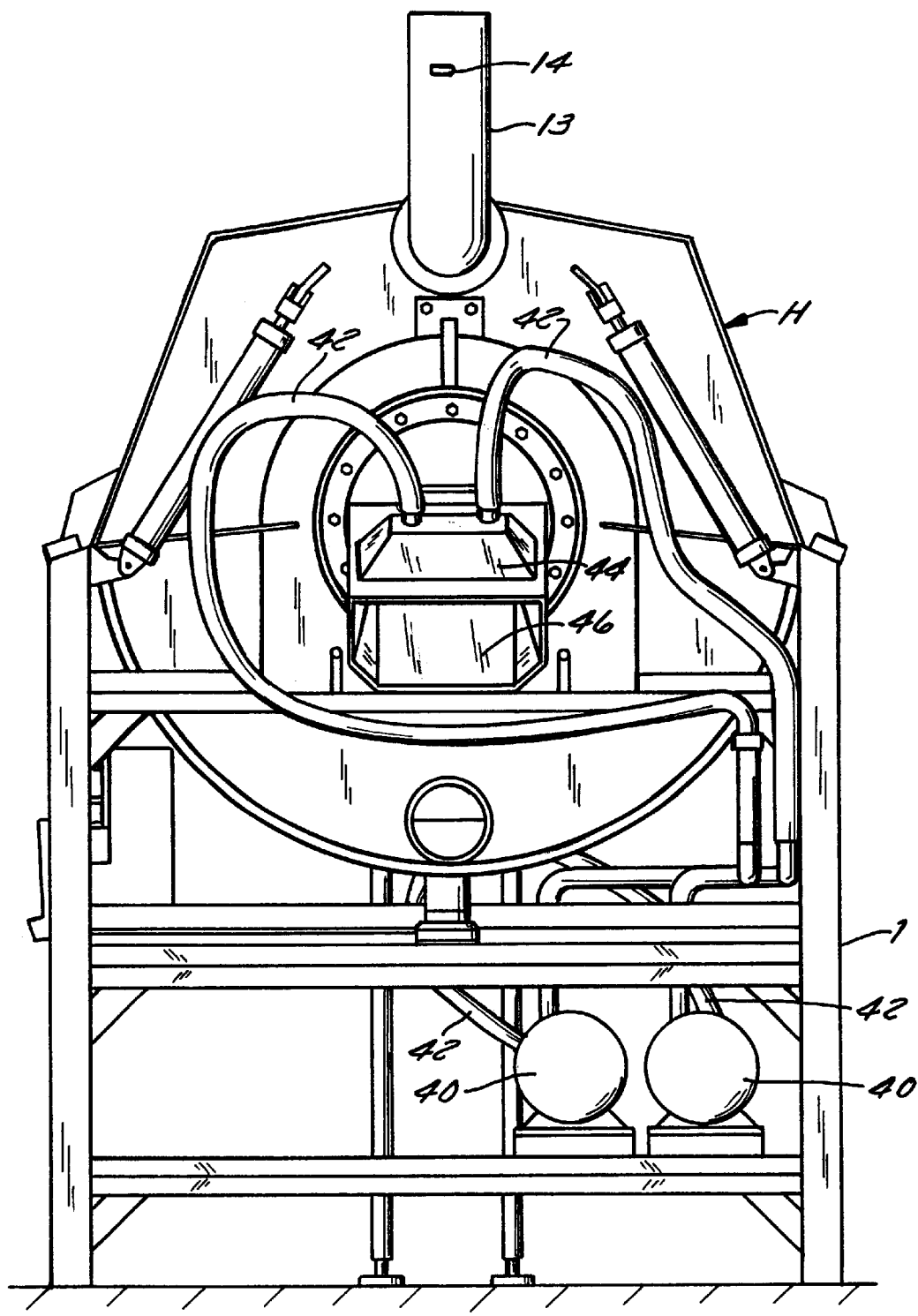
FIG. 3 is an elevational view of the discharge end of the blancher shown in FIG. 1.

Another aspect of the present invention relates to the discharge end (FIGS. 1, 3, 7, 9) of the blancher. Vacuum pump means 40 (FIGS. 2, 3, 9) is connected via lines 42 to the hood 44 fixed to the top of the discharge chute 46 and captures most of the steam from the chute 46 and pumps it back via pump discharge lines 47 to inlet fittings 48 on the in-feed end of the blancher (FIGS. 8, 9) and there injects it directly into the reservoir of water 10 in the bottom of the housing. This serves to reduce the amount of steam that would otherwise come out with product.

The water in the bottom of the housing provides a saturated water environment for the steam, and the steam does a better job of penetrating the product than does "dry" steam.

Another aspect of the invention provides labyrinth seals 60 and 61 (FIG. 6) at the joint between the outer wall 62 of the housing and wall 4 of rotatable drum 3. Such a seal is particularly effective to prevent steam loss.

The invention also relates to the location of the temperature sensor 16 (FIGS. 8 and 9) for sensing the temperature of the drum interior at a location well above the entry location 30 (FIGS. 8, 9) of the live steam and the product. Temperature sensors are thus strategically located in the drum and which can be read at a control panel (not shown) and thereby the temperature of the steam can be regulated as needed. For instance, the sensor 16 is located in the central part of the drum, and away from where steam is introduced into the drum, to thereby give appropriate readings.

Referring again to the rotary food product transport mechanism, such as, for example, an auger or screw 7, it rotates to urge the food (food product) received in the blancher towards the food product outlet. The auger/screw has at least one lift 50 (FIG. 7) at its' end adjacent the food product outlet for lifting food product inside the blancher to the food product outlet chute 46 so it can be discharged from the drum.

The auger or screw is received inside the cylindrical drum that is also located inside the blancher housing. The drum has an inlet opening 70 (FIGS. 1, 5, 9) in communication with the food product inlet trough for accepting food product into the drum. The drum also has an outlet opening 72 in communication with the food product outlet for enabling the food product to be discharged from the drum and out of the blancher. The housing drum also has the previously mentioned live steam pipes 30 (FIG. 19) for allowing the heat transfer medium, such as steam, to enter the drum area and contact and heat the food product in the drum. The drum is of generally cylindrical construction and has a side wall that is of perforate construction in the side wall that permit the steam to enter the drum.

By its construction, the drum can accommodate several hundred and preferably as many as several thousand food products at a given moment of blancher operation. Preferably, the auger/screw and the drum are constructed and arranged to rotate in unison or substantially in unison. In one preferred embodiment, the auger/screw is attached to the drum such that rotating the drum rotates the auger/screw.

Because the blancher is substantially sealed, the atmosphere within the blancher during operation increases the efficiency of the transfer of heat to the food product. Preferably, the atmosphere within the blancher is slightly pressurized.

To heat the food product inside the blancher, a heat transfer medium such as water or only steam is injected into the blancher at a pressure of at least about 60 psi.

In a preferred method of operation, at least one heat transfer medium is introduced into the blancher. Food products may be continuously introduced into the blancher through the food product inlet and are then blanched or cooked by heating due to heat transferred to the food products from the steam inside the blancher. Rotation of the rotary food product transport mechanism urges the food products inside the blancher toward the food product outlet. When the food products reach the food product outlet, the food products are discharged from the blancher through the novel food product outlet.

The present invention provides a rotary drum blancher that more quickly and efficiently heats food product, and a blancher that is shorter and smaller and which can continuously or substantially continuously cook or blanch the same amount of food product as compared to a blancher that is not sealed or substantially sealed.

The present invention provides a food blancher having a novel in-feed flume and vacuum pump discharge and steam vents in the upper portion, and that can operate in the conventional mode with water or with steam only as the heating medium.

What is claimed is:

1. A substantially sealed blancher for cooking food and having an elongated housing, a rotatable cylindrical drum mounted in said housing and through which food passes, a food inlet at one end of said housing and having an inlet feed flume extending into said housing for delivering food into said housing and drum, said flume being a partially enclosed trough, water nozzles directed into said trough to wet the flume interior and to move food through said flume and into said housing, a water supply in the bottom of said housing, and a pump having a fluid connection with said water supply and with said nozzles for delivering water under pressure from said housing to said nozzles for moving food through said flume and into said housing.

2. The blancher set forth in claim 1 further including a food discharge chute at the other end of said housing opposite from said one end and for receiving food that has passed through said housing and drum and discharging said food from said drum and housing, and a vacuum pump in communication with said chute for drawing off steam from said chute and food passing therethrough to substantially seal said outlet against loss of steam, said vacuum pump having a fluid connection with the water supply in the bottom of said housing for delivering the said steam drawn off from said chute and into said water supply.

3. The blancher set forth in claim 2 including a steam line for delivering live steam into said housing at a location above said water supply for heating the interior of said housing and drum for cooking food passing therethrough.

4. The blancher as described in claim 2 including a food transporting mechanism in said drum for moving food generally axially through said drum from said food inlet to said food discharge chute.

5. The blancher set forth in claim 1 in which said elongated housing has opposite end walls, said cylindrical drum has opposite end walls, one adjacent each of said housing end walls, and labyrinth seal means between adjacent housing end wall and drum end wall to prevent loss of steam therethrough.

6. A substantially sealed blancher for cooking food and having an elongated housing, a rotatable cylindrical drum, mounted in said housing and through which food passes, a food inlet at one end of said housing and having an inlet feed flume extending into said housing for delivering food into said housing and drum, said flume being a partially enclosed trough, water nozzles directed into said trough to wet the flume interior and to move food through said flume and into said housing, a water supply in the bottom of said housing, and a pump having a fluid connection with said water supply and with said nozzles for delivering water under pressure from said housing to said nozzles for moving food through said flume and into said housing, a food discharge chute at the other end of said housing opposite from said one end a food transporting mechanism in said drum for moving food generally axially through said drum from said food inlet to said food discharge chute, said discharge chute receiving food that has passed through said housing and drum and discharging said food from said drum and housing, and a vacuum pump in communication with said chute for drawing off steam from said chute and food passing therethrough to substantially seal said outlet against loss of steam, said vacuum pump having a fluid connection with the water supply in the bottom of said housing for delivering the said steam drawn off from said chute and into said water supply, a steam line for delivering live steam into said housing at a location above said water supply for heating the interior of said housing and drum for cooking food passing therethrough, said housing having opposite end walls, said drum having opposite end walls, one adjacent each of said housing end walls, and labyrinth seal means between adjacent housing end wall and drum end wall to prevent loss of steam therethrough.

7. A sealed blancher for cooking food which passes therethrough and having an elongated housing, a rotatable cylindrical drum mounted in said housing and through which food passes, a food inlet at one end of said housing and having an inlet feed flume extending into said housing for delivering food into said housing and drum, said flume being a partially enclosed trough, water nozzles directed into said trough to wet the flume interior and thereby prevent food from sticking to said flume and to move food through said flume and into said housing, a water supply in the bottom of said housing, and a pump having a fluid connection with said water supply and with said nozzles for delivering water under pressure from said housing to said nozzles for wetting the interior of said trough and said food therein for moving food through said flume and into said housing and thereby acting with said food to substantially seal said flume against steam loss from said housing.

8. The blancher set forth in claim 7 further including an elongated food discharge chute having open ends, said chute being located at the other end of said housing opposite from said one end and for receiving food that has passed through said housing and drum and discharging said food from said drum and housing, said chute being enclosed except for either of its ends, and a vacuum pump in communication with said chute for drawing off steam from the interior of said chute and from food passing therethrough to substantially seal said outlet against loss of steam, said vacuum pump having a fluid connection with the water supply in the bottom of said housing for delivering the said steam drawn off from said chute and into said water supply.

9. The blancher set forth in claim 8 including a steam line for delivering live steam into said housing at a location above said water supply for heating the interior of said housing and drum for cooking food passing therethrough.

10. The blancher as described in claim 7 including a rotatable auger in said drum for moving food generally axially through said drum from said food inlet to said food discharge chute.

11. The blancher set forth in claim 7 in which said housing has opposite end walls, said drum has opposite end walls, one adjacent each of said housing end walls, and labyrinth seal means between adjacent housing end wall and drum end wall to prevent loss of steam therethrough.

12. A sealed blancher for cooking food and having an elongated housing, a rotatable cylindrical drum mounted in said housing and through which food passes, a food inlet at one end of said housing, a food discharge chute at the other end of said housing opposite from said one end and for receiving food that has passed through said housing and drum and discharging said food from said drum and housing, and a vacuum pump in communication with said chute for drawing off steam from said chute and food passing therethrough to effectively seal said outlet against loss of steam, a water supply in the bottom of said housing, said vacuum pump having a fluid connection with said water supply in the bottom of said housing for delivering the said steam drawn off from said chute and into said water supply.

13. The blancher set forth in claim 12 including a steam line for delivering live steam into said housing at a location above said water supply for heating the interior of said housing and drum for cooking food passing therethrough.

14. The blancher as described in claim 12 including a food-transporting auger in said drum for moving food generally axially through said drum from said food inlet to said food discharge chute.

15. The blancher set forth in claim 12 in which said elongated housing has opposite end walls, said cylindrical drum has opposite end walls, one adjacent each of said housing end walls, and labyrinth seal means between adjacent housing end wall and drum end wall to prevent loss of steam therethrough.

16. A sealed blancher for cooking food and having an elongated housing with opposite ends, a rotatable cylindrical drum mounted in said housing and through which food passes, a food inlet at one end of said housing for delivering food into said housing and drum, a water supply in the bottom of said housing, a steam line for delivering live steam into said housing at a location above said water supply for heating the food in said blancher and the interior of said housing and drum for cooking food passing therethrough, a temperature sensor in said drum and located above said steam line delivery location, and a steam outlet in both said upper ends of said housing and having valve means for controlling the venting of steam from said housing depending on the temperature sensor.

17. A substantially sealed steam-only blancher for cooking food and having an elongated housing, a rotatable cylindrical drum mounted in said housing and through which food passes, a food inlet at one end of said housing, a food discharge chute at the other end of said housing opposite from said one end, a food transporting mechanism in said drum for moving food generally axially through said drum from said food inlet to said food discharge chute, a steam line for delivering live steam into said housing for heating the interior of said housing and drum for cooking food passing therethrough, a steam vent duct at each upper end of said housing and having a valve for regulating the discharge of vented steam from said housing, said housing having opposite end walls; said drum having opposite end walls, one adjacent each of said housing end walls; and seal means between adjacent housing end wall and drum end wall at each end of the blancher to prevent loss of steam therethrough.

* * * * *